United States Patent Office 3,798,259
Patented Mar. 19, 1974

3,798,259
SYNTHESIS OF γ-KETOESTERS
Pius Anton Wehrli, North Caldwell, N.J., assignor to Hoffmann-La Roche Inc., Nutley, N.J.
No Drawing. Filed Apr. 9, 1973, Ser. No. 349,594
Int. Cl. C07c 67/00, 69/66
U.S. Cl. 260—483       6 Claims

ABSTRACT OF THE DISCLOSURE

Alkanoyl propionates of the formula

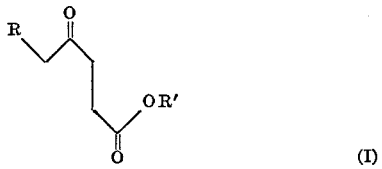

wherein R and R' are each lower alkyl
are prepared from the corresponding alkanoyl succinates by treatment with boric acid. These compounds are useful in the preparation of 2-alkyl-cyclopentan-1,3-diones which are valuable intermediates in the synthesis of natural products, particularly steroids.

BACKGROUND OF THE INVENTION

Alkanoyl propionates are valuable compounds which can be cyclized to afford 2-alkyl-cyclopentan-1,3-diones. These acycylic compounds serve as important starting materials for the synthesis of complex molecules, particularly those of natural origin such as steroids. It is known that alkanoyl propionates may be prepared from the corresponding alkanoyl succinates by a three-step procedure involving base or acid hydrolysis, decarboxylation and reesterification of the intermediate γ-keto acid. Friedmann, J. Prakt. Chemie., vol. 146, p. 159 (1936), and Franke et al., Monatsh, vol. 69, p. 167 (1936).

It would be greatly desirable to have a process for the direct conversion of alkanoyl succinates to alkanoyl propionates that avoids the above mentioned three-step procedure, particularly avoiding the hydrolysis and reesterification of the ester group. A more direct procedure would make these compounds more accessible and would allow for the preparation of complex molecules in a much more practical and economic fashion.

DETAILED DESCRIPTION OF THE INVENTION

The present invention relates to a novel process for the preparation of alkyanoyl propionates of the formula

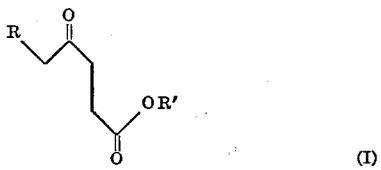

wherein R and R' are each lower alkyl.

More specifically, the present invention relates to the preparation of compounds of Formula I from compounds of the formula

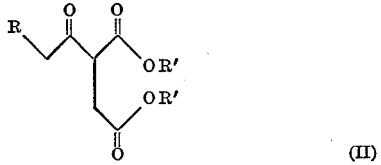

wherein R and R' are as above.

by treatment with a specific acidic agent, namely, boric acid. It has been found that, surprisingly, boric acid effects a direct one-step conversion of alkanoyl succinates of Formula II to alkanoyl propionates of Formula I, thus avoiding hydrolysis and reesterification of the ester group.

In the specification and appended claims, it is understood that the term "lower alkyl" refers to a monovalent, saturated, straight or branched chain hydrocarbon group of from 1 to 8 carbon atoms. Examples of lower alkyl groups are methyl, ethyl, n-propyl, butyl, hexyl, octyl, i-propyl, tert-butyl, and so forth.

In the process of the present invention, an alkanoyl succinate of Formula II is treated with boric acid at an elevated temperature, followed by an aqueous workup, to afford the corresponding alkanoyl propionate of Formula I.

During the reaction process, there is formed both a lower alkanol of the formula R'OH, as well as carbon dioxide. Little, if any, other volatile materials are produced during the reaction. The net result of the reaction is loss of the lower alkoxy carbonyl group adjacent to the alkanoyl group of the starting material. The reaction proceeds readily at elevated temperatures, preferably between about 120 and 250° C. An especially preferable temperature range for conducting the present reaction is between about 160 and 200° C. Normally, as the reaction proceeds, the alkanol R'OH that is formed distills from the reaction mixture. The rate of this distillation and, therefore, the removal of the alcohol R'OH from the reaction mixture, will depend upon the reaction temperature, the pressure and the boiling point of the alcohol. For lower molecular weight alcohols such as methanol and ethanol, distillation of the alcohol from the reaction mixture occurs at atmospheric pressure at the elevated temperatures normally employed. For higher boiling alcohols, it is preferred to conduct the reaction at a slightly reduced pressure to facilitate the removal of the alcohol from the reaction mixture.

During the course of the reaction, there is evolved carbon dioxide. The reaction can be conveniently monitored by following the evolution of carbon dioxide and the reaction is preferably continued until the evolution of carbon dioxide has substantially ceased.

The aforementioned reaction can be carried out either in the absence of solvent or in the presence of an inert organic solvent. As inert organic solvents, one skilled in the art would choose a solvent having a boiling point within or above the aforementioned elevated temperature ranges. As suitable inert organic solvents, there may be mentioned polyethers such as diglyme or triglyme; and amides such as hexamethylphosphoramide and N-methyl-2-pyrrolidone.

Normally, it is preferred to conduct the reaction in the absence of any solvent since the starting materials of Formula II are, for the most part, liquids at the elevated reaction temperatures, thus allowing the reaction to be conveniently carried out using the compound of Formula II as the reaction medium.

After the reaction is substantially complete, as monitored by carbon dioxide evolution, the reaction mixture is treated with water to free the product of Formula I, and this product is then isolated in the normal fashion using techniques such as extraction and distillation. It is generally preferred to purify the compound of Formula I by fractional distillation.

The reagent used to effect the conversion of compounds of Formula II of those of Formula I is boric acid. Since the presence of water can interfere with the reaction by, for example, hydrolysis of the ester group, it is preferred to use boric acid that is essentially anhydrous. The amount of boric acid that may be used in the present reaction is not unduly critical and can vary from about 0.1 mole to more than 1 mole, relative to starting material of Formula II. For optimum results, it is preferred to use between about ⅓ and 1 mole of boric acid relative to the compounds of Formula II. It is especially preferred to utilize approximately 1 mole of boric acid for each mole of compound of Formula II.

Alkanoyl succinates of Formula II are known compounds which may be prepared by a variety of methods. A particularly preferred method for the preparation of compounds of this type is the free radical addition of aldehydes to maleates or fumarates. This reaction is described in great detail by Patrick in Journal of Organic Chemistry, vol. 17, p. 1009 (1952).

Compounds of Formula I can be cyclized to 2-alkyl-cyclopentan-1,3-diones of the formula

(III)

wherein R is as above.

This cyclization is described in detail in U.S. Pat. 3,349,130.

Compounds of Formula III are important starting materials for the preparation of polycyclic complex organic molecules, particularly those of natural origin such as steroids. For these synthetic purposes, it is most useful to employ 2-alkyl-cyclopentan - 1,3 - diones wherein the lower alkyl group is methyl or ethyl. Accordingly, preferred embodiments of the process of the present invention involve the preparation of compounds of Formula I wherein R is methyl or ethyl.

The process of the present invention may be more fully understood and appreciated by reference to the following specific examples.

EXAMPLE 1

A solution of 1.032 kg. (6 mol) of diethyl maleate, 696 g. (12 mol) of freshly distilled propionaldehyde and 3.0 g. of dibenzoyl peroxide was heated, under UV-light (Hanovia Type 30620, 140 watts) to reflux (62°). After refluxing for 18 hours, another 3.0 g. of dibenzoyl peroxide was added. The pot temperature, after a total of 25 hours of reaction time, reached 65°. At this time the last 3.0 g. of dibenzoyl peroxide was added and refluxing was maintained until a total of 41.5 hours of reaction time (pot temp.=71.5°). A VPC analysis showed all maleate to have reacted. The reflux condenser was replaced by a Claisen distillation head and the excess propionaldehyde was distilled at atmospheric pressure (B.P. 48–49°, 286 g.). The product, diethyl propionylsuccinate, was distilled in vacuo to afford a main fraction, B.P. 147–152°/15–16 mm. (967.7 g. 72% based on maleate).

NMR: δ 1.0–1.45 (m, 9H), 2.6–3.05 (m, 4H), 3.9–4.4 (m, 5H)
MS: M+ at m/e 230

EXAMPLE 2

To 92.0 g. (0.4 mol) of diethyl propionylsuccinate was added 24.7 g. (0.4 mol) of boric acid. A Claisen condenser was attached and the mixture heated to ca. 150° within 1 hour. Ethanol was distilled (11.7 g.), and ca. 0.75 l. of gas was collected. The temperature was raised to 170° and after another 1.5 hours, a total of 8.3 l. of gas was collected. $CO_2$ evolution had ceased almost at the end and the reaction mixture had a clear light yellow appearance (total reaction time: 2.5 hours; VPC analysis of a sample showed the reaction mixture to contain only very little starting material). The contents were cooled to room temperature, poured onto 550 ml. of ice water and extracted with 3× 180 ml. of toluene. The combined layers were dried over $MgSO_4$, the solvent removed in vacuo and the residue distilled, using a 10 cm. Vigreux apparatus. A main fraction of 48.6 g. (77%) ethyl propionylpropionate, B.P. 109–112°/18 mm. was collected.

NMR: δ 1.05 (t, J=7, 3H), 1.2 (t, J=7, 3H), 2.4–2.9 (m, 6H), 4.2 (q, J=7, 2H)
MS: M+ at m/e 158

EXAMPLE 3

A mixture of 77.4 g. (0.45 mol) of diethyl maleate, 3.6 g. of dibenzoyl peroxide and 129.6 g. (1.8 mol) of freshly distilled butyraldehyde was refluxed for 24 hours. The pot temperature rose from initially 77° to finally 84°. A VPC sample showed all diethyl maleate to be converted after this time. The light yellow solution was cooled to room temperature, extracted with 150 ml. of saturated $NaHCO_3$ solution and washed with 2× 100 ml. of water. The organic layer was dried over anhydrous $Na_2SO_4$ and distilled in vacuo. A main fraction of diethyl butyrylsuccinate boiling from 100–130°/0.05 mm., 96.3 g. (87%), was collected.

NMR: δ 0.9–1.9 (m, 11H), 2.65–3.1 (m, 4H), 4.0–4.5 (m, 5H)
MS: M+ at m/e 244, base peak at 71

EXAMPLE 4

To 85.4 g. (0.35 mol) diethyl butyrylsuccinate, preheated at 135° in an oil bath, was added, in four portions, 21.6 g. (0.35 mol) of boric acid. A distilling condenser was attached to the reaction flask, while the temperature of the oil bath was raised to 200°. Ethanol started to condense and $CO_2$ gas was evolved. After 6 hours at 200° oil bath temperature, a total of 8 l. of $CO_2$ was collected. The internal temperature remained constant at 185° after this time. A VPC-analysis of a drawn sample indicated that all starting material had disappeared. The light yellow reaction mixture was cooled to room temperature, poured into 340 ml. of ice-water and extracted with 3× 150 ml. of ether. The organic phases were dried over anhydrous $MgSO_4$ and distilled. A main fraction of 48.1 g. (80%) ethyl butyrylpropionate, B.P. 115–115.5°/17 mm., was collected.

NMR: δ 0.92 (t, J=7, 3H), 1.22 (t, J=7, 3H), 1.90 (h, J=7, 2H), 2.2–2.6 (m, 6H), 4.05 (q, J=7, 2H)
MS: M+ at m/e 172

EXAMPLE 5

To a mixture of 64.5 g. (0.375 mol) of diethyl maleate and 171 g. (1.5 mol) of freshly distilled n-heptanal was added 3.0 g. of dibenzoyl peroxide. This reaction mixture was heated at 79° (pot-temp.) for 6 hours before it was worked up by washing with 175 ml. of sat. $NaHCO_3$ solution, followed by washing with 3× 100 ml. of water. The organic phase was dried over anhydrous $Na_2SO_4$ and distilled in vacuo.

A main fraction of 80 g. (75%) diethyl heptanoylsuccinate, B.P. 127–134°/0.035 mm., was collected.

NMR: δ 0.8–1.9 (m, 20H), 2.66–3.0 (m, 4H), 3.9–4.4 (m, 5H)
MS: M+ at m/e 286

EXAMPLE 6

Into a 100 ml. round-bottomed flask was added 48.6 g. (0.17 mol) of diethyl heptanoylsuccinate and 10.5 g. (0.17 mol) of boric acid (Reagent Grade, Allied Chemical). The flask was equipped with a distillation condenser, the end of which was connected to a gas measuring device and a receiving flask. The mixture was heated in an oil bath under continuous magnetic stirring. After heating for 1.75 hours at 195–210° (oil bath), the pot temperature gradually increased to 200° C. During this time, 4.2 g. of low boiling material was condensed and 3600 ml. of $CO_2$ gas was collected. A VPC sample of the pot residue showed that only trace amounts of starting material were present after this time. The contents were cooled to room temperature and the reaction mixture poured onto 180 ml. of ice water. The product was extracted with 3× 90 ml. of ether, the organic phases combined and dried over anhydrous $MgSO_4$. After removing the solvent on a Swissco rotary evaporator, the crude residue was distilled in vacuo using a 10 cm. Vigreux distillation apparatus to afford a main fraction, 29.04 g. (80%) of ethyl heptanoylpropionate, B.P. 152.5–153.5°/16 mm.

NMR: δ 0.88 (m, 3H), 1.0–1.6 (m, 11H), 4.08 (q, J=7, 2H)

MS: M+ at m/e 214

I claim:

1. A process for the preparation of a compound of the formula

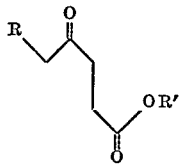

(I)

wherein R and R' are each lower alkyl of 1–8 carbon atoms which comprises contacting a compound of the formula

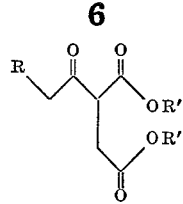

(II)

wherein R and R' are as above with boric acid at an elevated temperature of about 120°–250° C. in the absence of a solvent or in the presence of an inert organic solvent and contacting the product thereof with water.

2. The process of claim 1 wherein the temperature is between about 160° and 200° C.

3. The process of claim 1 wherein R is methyl or ethyl.

4. The process of claim 1 wherein between about ⅓ and 1 mole of boric acid per mole of starting compound of Formula II is utilized.

5. The process of claim 4 wherein about 1 mole of boric acid per mole of starting compound of Formula II is utilized.

6. The process of claim 1 wherein the reaction is carried out in the absence of a solvent.

References Cited
UNITED STATES PATENTS 3,518,296   6/1970   Bucourt et al. _____ 260—483

OTHER REFERENCES

Monatsh, vol. 69, p. 167 (1936).

J. Prakt. Chemie, vol. 146, p. 159 (1936).

VIVIAN GARNER, Primary Examiner

U.S. Cl. X.R.

260—586 R